United States Patent [19]
Bassett

[11] 4,455,907
[45] Jun. 26, 1984

[54] TABLE SAW HAVING LATERALLY ADJUSTABLE SAW

[76] Inventor: Alvin L. Bassett, 11365 SE. Stevens Rd., Portland, Oreg. 97266

[21] Appl. No.: 470,292

[22] Filed: Feb. 28, 1983

[51] Int. Cl.³ .............................................. B27B 5/22
[52] U.S. Cl. ..................................... 83/438; 83/477.1; 83/477.2
[58] Field of Search .................... 83/438, 477.1, 477.2, 83/508.2, 433, 398

[56] References Cited

U.S. PATENT DOCUMENTS

| | | | |
|---|---|---|---|
| 206,838 | 8/1978 | Shibeley | 83/477.1 |
| 307,600 | 11/1884 | Thomas | 83/477.1 |
| 1,390,958 | 9/1921 | Hulbert | 83/477.1 |
| 3,866,502 | 2/1975 | Brewer | 83/477.2 |

*Primary Examiner*—James M. Meister
*Attorney, Agent, or Firm*—John A. Hamilton

[57] ABSTRACT

A table saw consisting of a base, a table top supported by the base and consisting of a pair of coplanar slabs spaced apart to define a wide gap extending the full length of the table, a saw carriage slidable lengthwise of the table within the gap, in guideways mounted at the confronting edges of the slabs, a powered circular saw mounted on the lower surface of the carriage with its blade in a plane transverse to the gap and projecting upwardly through an aperture of the carriage, a filler plate at least as long as the table, flush with the tops of the slabs and overlying the gap between the slabs and also said carriage, the filler plate being slidable longitudinally of the table, having a series of longitudinally spaced apertures formed therein, and adapted to be indexed relative to the carriage to bring any one of its apertures into coincidence with the carriage aperture, and a clamp operable to secure said carriage at any desired position in its sliding movement.

11 Claims, 5 Drawing Figures

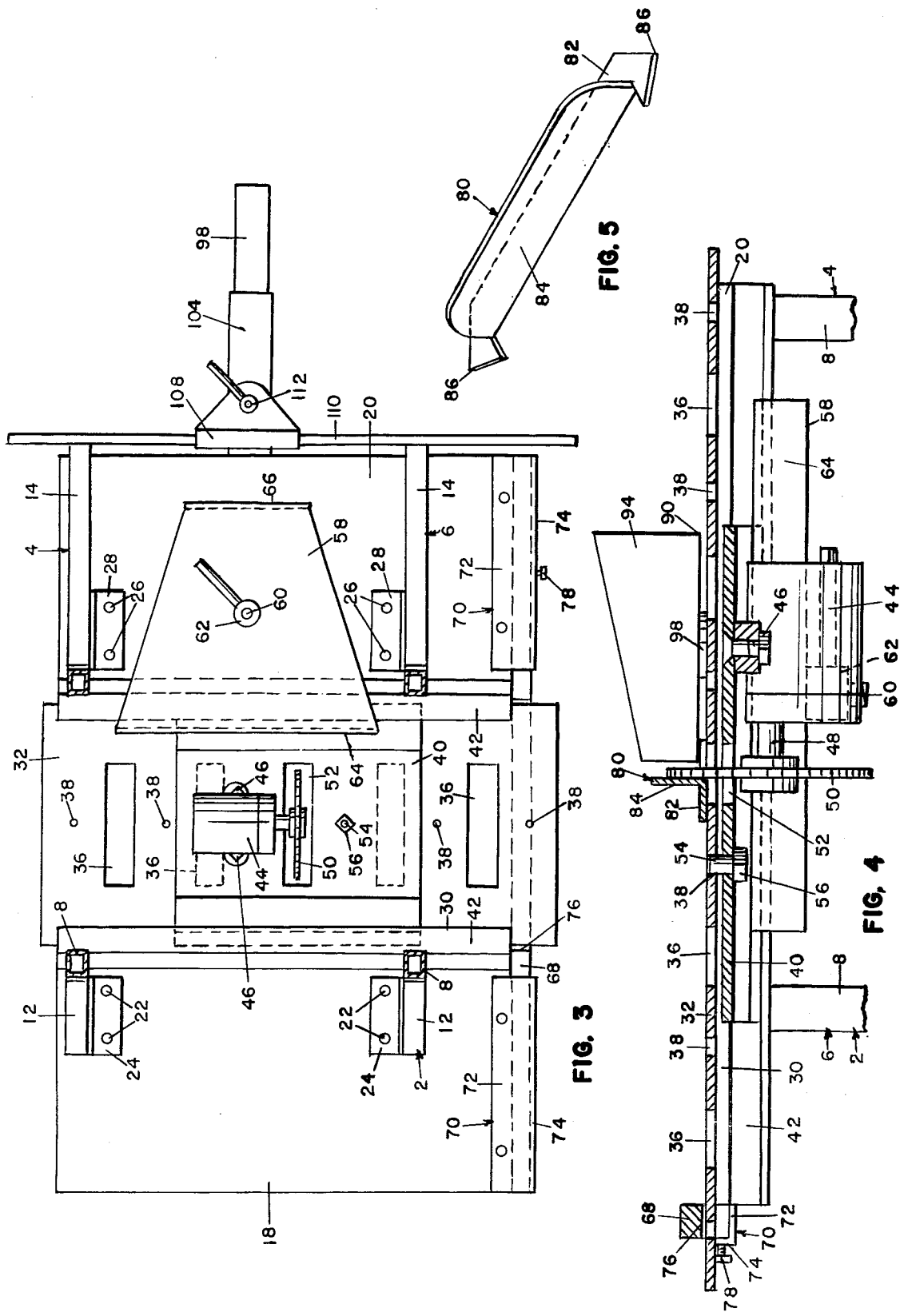

TABLE SAW HAVING LATERALLY ADJUSTABLE SAW

This invention relates to new and useful improvements in power saws of the table type, in which a power saw is mounted beneath the table, with its circular blade disposed in a vertical plane and projecting upwardly through an aperture of the table top to cut work pieces moved slidably over said table top. Usually the work piece is guided relative to the saw blade by a raised "fence" at an edge of the table parallel to the plane of the saw blade, with the width of the board or other work piece being cut being determined by the lateral distance between the fence and the blade. Heretofore, adjustment of this width has usually been provided by moving the fence over the table top to space it at greater or lesser distance from the plane of the saw blade. This mode of adjustment has not been completely satisfactory, due for example to difficulites of maintaining the fence bar rigid and therefore accurately straight between adjustable mounting of its ends at the sides of the table, difficulties of insuring precisely equal adjustments of the two end mountings of the fence, in order to insure parallelism of the fence with the blade plane, and to the fact that moving the fence close to the blade plane seriously reduces the capacity of the table in some operations (for example, in sawing narrow strips from wide boards), by reducing the portion of the table top still available for supporting the board. It has not been considered practical to move the saw itself relative to a fixed fence at one edge of the table, since this adjustment, if it is desired to any great degree, requires a blade aperture in the table top which is so extensive that it would effectively destroy the continuity of the table top, so that is could not effectively support a work piece at areas thereof closely adjacent the blade. The overcoming of these difficulties is the primary object of the present invention.

Accordingly, an important object of the present invention is the provision of a table saw the table top of which has a fixed raised fence at one end thereof, and means for adjustably moving the saw blade, transversely of its plane, along the full length of the table, transversely of said fence, while still maintaining substantially uninterrupted continuity of the table top at all times. Generally, this object is accomplished by the provision of a table top comprising two slabs spaced apart to form a wide, parallel-sided gap therebetween and extending the length of the table, a saw carriage mounted between said slabs and beneath said gap, a powered saw mounted on said carriage with its circular blade disposed with its plane transverse to said gap and projecting above said slabs, said carriage being slidable longitudinally of said gap to dispose said blade at any point in the length of the table, and a filler plate flush with the top of the slabs and overlying both said gap and said carriage, being slidable longitudinally of said gap and having a series of longitudinally spaced apart apertures formed therethrough, each adapted to receive said saw blade upwardly therethrough. By proper selection of the filler plate aperture used, said filler plate may be positioned to overlie the gap completely, and hence to preserve the continuity of the table top, regardless of the position of the saw blade itself. A raised, fixed fence at one end of the table, extending transversely across said gap parallel to the saw blade, but not interfering with longitudinal adjustment of either said carriage or said filler plate, guides work pieces as they are cut by said blade.

Another object is the provision of a table saw of the character described with the addition of means operable to index said filler plate against longitudinal movement relative to said carriage, whereby to selectively fix any one of said filler plate apertures in proper relation to said saw blade, and a single clamp operable to secure said carriage fixedly at any desired position in its sliding movement, whereby both the carriage and the filler plate are secured in fixed relation to said fence.

A further object is the provision of a table saw of the character described including an auxiliary work guide of the protractor type, also adjustable along the full length of the table, and operable to position a work piece angularly to the plane of the saw blade, for performing miter cuts.

A still further object is the provision of a table saw of the character described including a special gauging arrangement whereby the spacing between the blade and the fence may be set with great accuracy.

Other objects are simplicity and economy of construction, and efficiency and dependability of operation.

With these objects in view, as well as other objects which will appear in the course of the specification, reference will be had to the accompanying drawings, wherein:

FIG. 3 is a sectional view taken on line III—III of FIG. 2, FIG. 4 is an enlarged, fragmentary sectional view taken on line IV—IV of FIG. 1, and FIG. 5 is a perspective view of the gauge member only.

Figure 1:
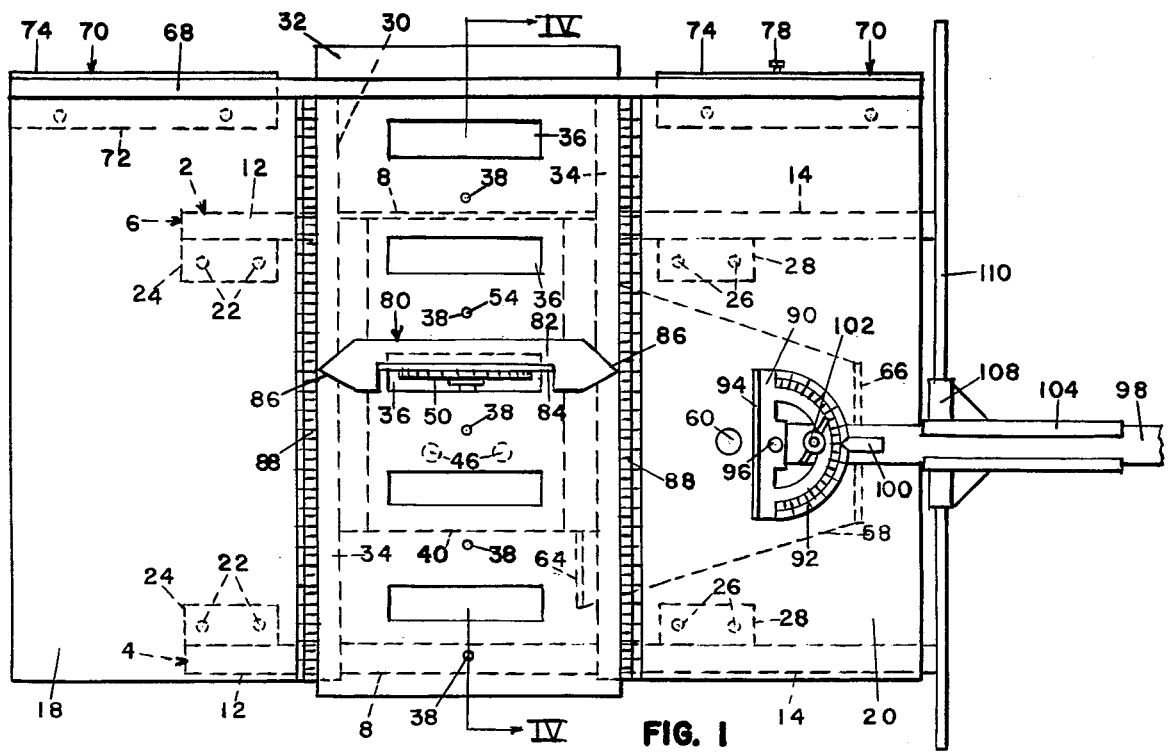
FIG. 1 is a top plan view of a table saw embodying the present invention.
Figure 2:
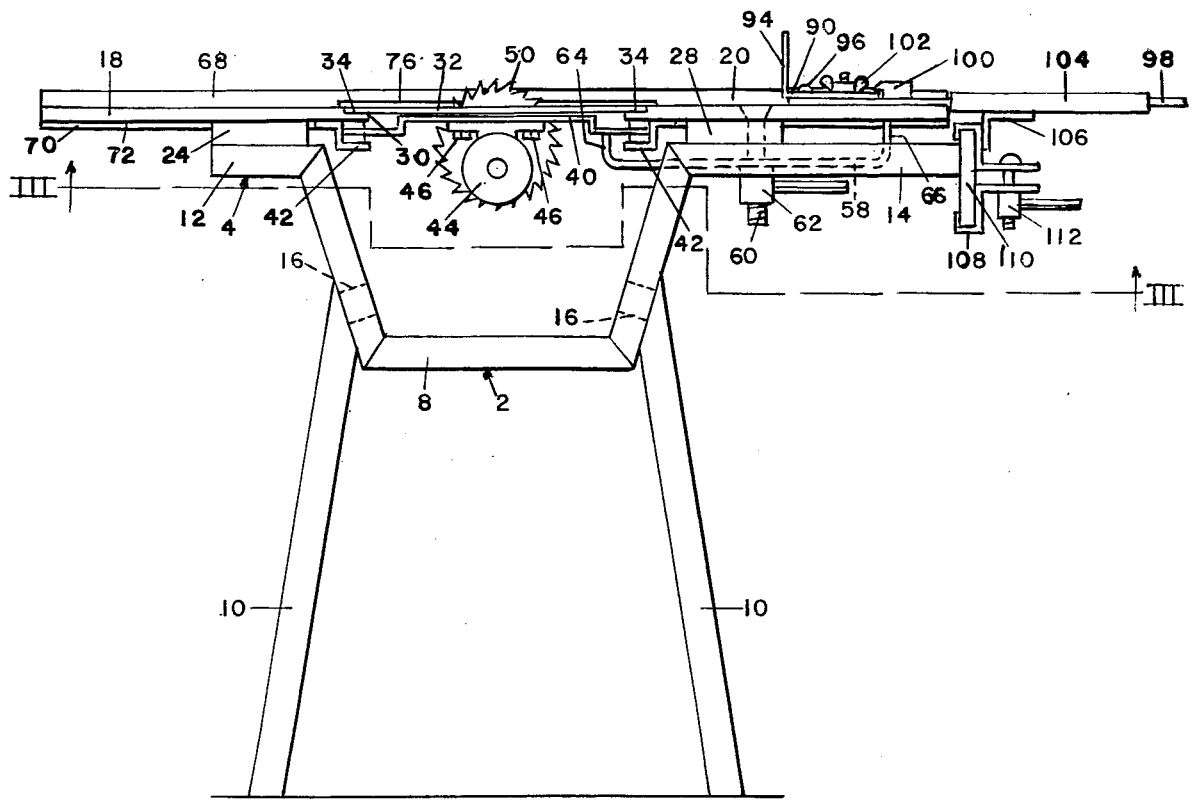
FIG. 2 is a front elevational view of the table saw with the gauge member omitted.

Like reference numerals apply to similar parts throughout the several views. For convenience, the upper horizontal edge of the table top, as viewed in FIG. 1 will be referred to as its rearward edge. As shown, the table top is thus wider than it is long. The table top is supported by a base indicated generally by the numeral 2, formed as shown of square tubular stock and being of one-piece integral construction. It includes a vertical planar front frame 4 disposed in a plane transverse to the table adjacent the forward edge of the table top, and a similar rear frame 6 disposed in forwardly spaced relation from the rearward edge of the table top. Each of frames 4 and 6 comprises an upwardly opening U-formation 8 supported by a pair of downwardly divergent floor-engaging legs 10, and a pair of horizontal arms 12 and 14 extending respectively to the left and to the right of the upper ends of U-formation 8, right arms 14 being substantially longer than left arms 12. Frames 4 and 6 are connected rigidly by a pair of forwardly and rearwardly extending horizontal bars 16, as indicated in FIG. 2.

The table top is formed partially by a planar horizontal slabs 18 and 20, the major dimensions of which extend forwardly and rearwardly of the table. Left slab 18 is secured, as by screws 22, to a pair of brackets 24 affixed to the left arms 12 of frames 4 and 6, and right slab 20 is secured, as by screws 26, to a pair of brackets 28 affixed to the right arms 14 of frames 4 and 6. The slabs 18 and 20 are spaced apart transversely of the table to define a parallel-sided gap 30 therebetween, said gap extending the full length of the table and having a width at least greater than the diameter of the circular saw blade to be used, as will appear. Said gap is centered over the U-formations 8 of frames 4 and 6. Said gap is substantially covered at all times by a rectangular filler plate 32, somewhat longer than the lengths of slabs 18 and 20, and having its side edge portions resting slidably on depressed ledges 34 cut into the upper surfaces of slabs 18 and 20 at their confronting edges, so that the upper surfaces of the slabs and the filler plate are coplanar. The filler plate may thus be moved slidably forwardly or rearwardly relative to the slabs, and may project from either the forward or rearward edge of the table, or both, as indicated in FIGS. 1 and 3. Formed through said filler plate are a series of longitudinally spaced apart, transversely elongated apertures 36. Said apertures are transversely centered relative to the filler plate, have a length at least greater than the diameter of the saw blade or other cutting tool to be used, and a width at least somewhat greater than the thickness of any such cutting tool. Also formed through said filler plate, between each successive pair of apertures 36 and outside of the endmost apertures, are a series of small index holes 38, the function of which will be described hereinbelow.

Also disposed slidably in and spanning table gap 30 is a saw carriage 40 constituting a horizontal plate of lesser longitudinal length than the filler plate. Its longitudinal edge portions are thickened by strips of metal affixed thereto, and are disposed slidably in a pair of guideways 42 affixed respectively, by any suitable means, to the lower surfaces of the confronting edge portions of the table slabs 18 and 20. It also, at certain adjustments thereof, projects outwardly from either the forward or rearward edge of the table. The transversely central portion of the carriage plate is offset upwardly to lie directly beneath filler plate 32 in closely spaced, parallel relation thereto. A powered saw unit is mounted on the lower surface of the carriage plate, and consists generally of an electric motor and geared speed changer unit 44 the case of which is affixed to the carriage plate by bolts 46. The motor is normally supplied with power by a flexible electric cable, and controlled by a switch disposed at any convenient location. The output shaft 48 of the unit projects longitudinally of the table and a circular saw blade 50 or other cutting tool, such as a grooving tool or a dado tool, affixed to said output shaft. The plane of said blade, as shown, is vertical, and projects upwardly through an aperture 52 of the carriage plate and a coinciding aperture 36 of the filler plate, to extend above said filler plate. A vertical index pin 54 is affixed at its lower end in a nut 56 welded to the carriage plate, and engages in any one of the index holes 38 of said filler plate. Holes 38 are so spaced, relative to apertures 36, that so long as pin 38 is engaged in any one of holes 38, one of apertures 36 of the filler plate will be disposed in coinciding relation above aperture 52 of the carriage plate. Easily within the bounds of current practice, the mounting of motor unit 44 on the carriage plate may be made adjustable, both vertically to vary the projection of the blade above the filler plate, for cutting boards of different thickness laid on the table, and tiltably in a plane at right angles to the rearward edge of the table, for making bevel cuts. However, these adjustments are not considered pertinent to the present invention, and are therefore not shown.

A horizontal clamp plate 58 is disposed beneath right table slab 20 and the right edge portion of carriage 40, and is urgable upwardly by a bolt 60 secured at its upper end in slab 20, extending downwardly through said clamp plate, and having a manually operable nut 62 threaded on its lower end. At its left edge, said clamp plate is provided with an upturned flange 64 bearing at its upper edge against the lower surface of the carriage plate, and at its right edge with an upturned flange 66 bearing at its upper edge against the lower surface of table slab 20. When nut 62 is loosened, carriage 40 may be moved slidably in guideways 42, but it is releasably secured against movement by tightening of said nut. The clamp is operable at all positions of the carriage.

A guide fence 68, which may be an elongated rectangular bar of wood or the like, is arranged along the rearward edge of table slabs 18 and 20, and extends the full width of the table, also traversing gap 30 between the slabs. Said fence is supported by a pair of elongated angle brackets 70 each extending along the rearward edge of one of said slabs. Each of said brackets constitutes a horizontal leg 72 affixed to the lower surface of the associated table slab, and a vertical leg 74 parallel to and spaced rearwardly from the rearward edge of the associated table slab, and having a vertical height no greater than the thickness of said slab. The fence rests on said brackets between bracket leg 74 and the rearward edges of the slabs, and projects above said slabs in order to guide a work piece moved slidably over the table in engagement therewith. Within the span of table gap 30, the lower portion of the fence is notched away, as indicated at 76, in order not to interfere with rearward projection of either the filler plate or the saw carriage from the rearward edge of the table. A set screw 78 threaded through the vertical leg 74 of one of brackets 70 secures the fence against accidental longitudinal movement, and also permits removal of the fence when its use is not required.

In order to provide for precise measurement for the width of a board to be cut by the saw blade, a special gauge 80 is provided, as shown in FIGS. 1, 4 and 5. Said gauge constitutes an elongated sheet metal angle formation having a length equal to the width of filler plate 32, having a horizontal leg 82 adapted to be laid flat against the top of said filler plate, and a vertical leg 84 adapted to be pressed flat against either face of saw blade 50. The ends of horizontal leg 82 are tapered to points 86 which indicate a point on calibrated scales 88 imprinted on the top surfaces of table slabs 18 and 20 immediately adjacent the filler plate. Applied as shown in FIG. 1, points 86 of the gauge indicate on scales 88 the precise distance between fence 68 and the closest face of the blade, in order that the desired width of a board being cut, from the fence to the blade, will not be affected by the width of the saw cut itself. If the desired measurement is from the blade to the opposite or forward edge of a board, the gauge is placed against the forward face of the blade.

An auxiliary work guide is provided, useful for example in making miter cuts. Said auxiliary guide includes a generally semi-circular protractor plate 90 disposed just above right table slab 20, its semi-circular edge being graduated in angular degrees as indicated at 92 and having a vertically upright flange 94 at its opposite edge. Said protractor plate is pivoted, concentrically with its semi-circular edge, as at 96, to the inner end of a flat, elongated slide bar 98 of any desired length, which projects outwardly over the right edge of right table slab 20, accurately at right angles thereto, and parallel to the plane of saw blade 50. The horizontal angularity of protractor flange 94 relative to the plane of saw blade 50 may be set by pivoting the protractor plate to bring the desired angle indication of scale 92 beneath a pointer 100 fixed on slide bar 98, and fixing the adjustment by means of a clamp screw 102. The outwardly extending portion of slide bar 98 is guided for longitudinal sliding movement only in an elongated slide 104, which in turn is affixed by bracket 106 to a slide clamp 108 mounted on and movable along a bar 110 which extends horizontally and longitudinally of the table below the right edge of slab 20, being affixed to the extreme ends of right arms 14 of frames 4 and 6 of the table base. Thus protractor plate 90 may be moved to any desired point along the entire length of the table by sliding clamp 108 along bar 110, and the adjustment fixed by tightening a manually operable tightening screw 112 of said clamp. This adjustability of the protractor is rendered necessary by the fact that the saw blade itself is adjustably movable along the entire length of the table. By adjusting protractor flange 94 to any desired angle relative to the plane of the saw blade, and holding a work piece against said flange while moving it across the blade by moving slide bar 98 in slide 104, very accurate miter cuts may be made.

In general operation, the user first removes fence 68 after loosening set screw 78, and also removes filler plate 32. He then disengages clamp plate 58 by loosening nut 62, and manually slides carriage 40 in guideways 42 to position saw blade 50 at the approximate desired distance from the rearward edge of the table. Then he reinserts the filler plate, taking care to apply an aperture 36 of said filler plate over saw blade 50 such that said filler plate extends outwardly from both the forward and rearward edges of the table, and engages the corresponding index hole 38 of the filler plate over index pin 54 of the carriage. This locks the carriage and filler plate together for simultaneous longitudinal movement, with one of apertures 36 coincident with carriage aperture 52, and with saw blade 50 projecting upwardly through the coinciding apertures. Fence 68 may then be reinserted. The user then rests gauge 80 on the filler plate as in FIGS. 1 and 4, and leg 82 thereof flat against the filler plate, and with vertical leg 84 thereof flat against either the rearward face of blade 50, as shown, if measurement is to be made from the blade to the fence, or against the forward face of the blade if measurement is to be made from the edge of a board opposite to that engaging the fence. Then, reaching beneath the table, the user carefully slides carriage 40 in guideways 42 until pointers 86 of gauge 80 indicate the desired measurement on scales 88. Finally, the user reengages clamp 58 by tightening nut 62 to lock the carriage in position, and the saw is ready for use. A board moved over the table top with one edge thereof in engagement with fence 68, and moving in engagement with blade 50, will be cut to a very accurate width, even taking into consideration the width of the saw cut itself. The use of the protractor flange 94 for making miter cuts has been previously described.

The present table saw will be seen to possess numerous advantages. The use of a fixed and stationary fence 68 at the rearward edge of the table, rather than a fence movably mounted on the table for lateral adjustment relative to a saw blade disposed at a fixed position relative to the table, provides that the fence is always accurately placed, and not subject to being inaccurately adjusted or placed in non-parallel relation to the saw blade plane. It also permits the fence to be supported laterally along most of its length, so that it will not bow or flex horizontally, but is maintained accurately straight for better guidance of work pieces. At the same time, the saw blade itself is adjustably movable along the entire length of the table. This compensates fully for the stationary positioning of the fence, leaving the full length of the table available at all times for supporting boards having a width at least as great as the table length. Even wider boards could be accomodated, and fully supported by placing extension tables forwardly of that shown. However, such extension tables are not considered pertinent to the present invention, and are not shown. The use of filler plate 32 eliminates the otherwise full length opening in the table top which would be required to permit adjustment of the saw blade along the full length of the table top rendering the continuity of the table top substantially unbroken at all positions of the saw. The continuity provided by the filler plate gives substantially unbroken support for boards being cut, particularly at points closely adjacent the saw blade, where such support is necessary for accurate work. The gauge 80 provides means for compensating virtually automatically even for the width of the saw cut, or kerf, itself, and thus is an aid to still more accurate work. The general principle of auxiliary work guide 90, of the protractor type, is of course old, but in this case is differentiated from others of similar types by the fact that said guide is slidable adjustably along bar 110 to accomodate the movability of the blade itself lengthwise of the table, as compared to the usual arrangement in which both the blade and the protractor guide are disposed at fixed positions lengthwise of the table.

Most circular saw blades such as shown at 50 are adapted to cut boards moving in one direction only, that is, boards moving from right to left as shown in FIGS. 1-3. However, saw carriage 40 in the present device may be disengaged from guideways 42, reversed 180 degrees, and reinserted in the guideways, if the operator desires to work from the left side of the table, and move boards across the table from left to right. Also, the carriage may be inverted in its guideways to expose saw unit 44 at the top thereof, so long as filler plate 32 has been removed. This is a great convenience, providing the saw unit with a solid base, whenever it may be desired to mount, demount or adjust the saw unit, or to interchange saw blade 50 with other cutting tools.

While I have shown and described a specific embodiment of my invention, it will be readily apparent that many minor changes of structure and operation could be made without departing from the spirit of the invention.

What I claim as new and desire to protect by Letters Patent is:

1. A table saw comprising:
   a. a base,
   b. a table top carried by said base and comprising a pair of horizontal slabs spaced apart to form a parallel sided gap therebetween extending the full length of the table top,
   c. a fixedly mounted fence extending across the rearward edge of said table top, bridging said gap and rising above the upper surfaces of said slabs,
   d. a saw carriage mounted on said table top beneath said gap and including a powered circular saw blade disposed in a generally vertical plane parallel to said fence and projecting above said slabs through said gap, said carriage being adjustably movable longitudinally of said gap to dispose said blade selectively at any point in the entire length of said table, and e. a filler plate overlying said gap with its upper surface coplanar with the upper surfaces of said slabs, said filler plate also being adjustably movable longitudinally of said gap, and having a series of longitudinally spaced apart apertures found therethrough, any one of said apertures being engageable to accomodate the upwardly projecting portion of said saw blade, whereby said filler plate may cover said gap substantially completely at any position of said saw blade longitudinally of said gap.

2. A table saw as recited in claim 1 with the addition of:

a. indexing means operable to secure said filler plate against movement longitudinally of said gap relative to said saw carriage, at any of a series of positions in which any saw blade aperture of said filler plate is disposed in a position to accept said saw blade therethrough, and b. fixing means operable to secure said saw carriage against movement longitudinally of said gap relative to said table top.

3. A table saw as recited in claim 2 wherein said filler plate indexing means comprises a vertical pin fixed in said saw carriage and projecting upwardly therefrom to engage selectively in any of a series of index holes formed in said filler plate, but not above said filler plate, said index holes being so positioned relative to the blade apertures of said filler plate that when said index pin is engaged in any one of said index holes, a blade aperture of said filler plate will be positioned to accept said saw blade therethrough.

4. A table saw as recited in claim 2 wherein said saw carriage includes a parallel-sided horizontal plate having its lateral edge portions slidably engaged respectively in a pair of horizontal guideways fixed to the lower surfaces of said table slabs adjacent said gap and extending the full length of the table, and wherein said saw carriage fixing means constitutes a manually operable clamp operable to fix said carriage plate releasably against sliding movement in said guideways.

5. A table saw as recited in claim 4 wherein said saw carriage extends both forwardly and rearwardly from said saw blade, and wherein said carriage guideways are open-ended, whereby said carriage may be extended forwardly or rearwardly of the table top to position said saw blade at the extreme forward or rearward edges of the table top, and whereby the saw carriage may be removed from and reinserted into said guideways, this removability of said carriage permitting either horizontal reversal of said carriage to reverse the direction in which said blade is best adapted to cut, or vertical inversion thereof to expose the saw elements carried thereby for more convenient servicing.

6. A table saw as recited in claim 1 wherein said filler plate may project rearwardly from the rearward edge of said table top, and wherein the lower portion of that part of said fence traversing said gap is removed so as not to interfere with said rearward projection of said filler plate.

7. A table saw as recited in claim 6 wherein said fence is detachably mounted on said table top, whereby it may be removed either when its use is not required, or to permit upward removal of said filler plate.

8. A table saw as recited in claim 1 with the addition of a gauge device comprising an elongated member equal in length to the width of said filler plate and having pointers at each end adapted to indicate points on scales imprinted on the tops of said table slabs adjacent the edges of said filler plate, whereby when said member is held against a face of said blade, said pointers will indicate on said scales the distance of said blade from said fence.

9. A table saw as recited in claim 8 wherein said gauge device comprises an elongated sheet metal member of angle form, having a horizontal leg adapted to be pressed against said filler plate, and a vertical leg adapted to be pressed against the face of said blade to which measurements are to be made, the apeces of the pointers at the ends thereof lying in the same vertical plane as the surface of said vertical leg engageable with said saw blade.

10. A table saw as recited in claim 1 with the addition of an auxiliary work guide comprising:

a. a vertical guide plate disposed over said table top and having a horizontal protractor plate fixed thereto, b. a slide bar pivoted at its plate inner end to said protractor plate on a vertical axis and extending transversely outwardly over a side edge of said table top, parallel to the plane of said blade, said guide plate being adjustable to any desired horizontal angle relative to said slide bar by means of said pivotal connection, c. a slide disposed outwardly from said side table edge in which said slide bar is guided for longitudinal sliding movement only, and d. means mounting said slide on said table for adjustable movement along the full length of said table.

11. A table saw as recited as claim 10 wherein said slide mounting means comprises:

a. a horizontal guide bar affixed to said table base at one side of said table top, and extending at least the full length of said table top, b. a slide clamp movable along said guide bar, said slide being affixed to said clamp, and c. manually operable means for tightening said clamp to prevent movement thereof along said guide bar.

* * * * *